United States Patent [19]

Friedl

[11] 4,456,171
[45] Jun. 26, 1984

[54] VEHICLE HEATER

[75] Inventor: Reiner Friedl, Starnberg, Fed. Rep. of Germany

[73] Assignee: Webasto-Werk W. Baier GmbH & Co., Gauting, Fed. Rep. of Germany

[21] Appl. No.: 415,998

[22] Filed: Sep. 8, 1982

[30] Foreign Application Priority Data

Sep. 16, 1981 [DE] Fed. Rep. of Germany ....... 3136833

[51] Int. Cl.³ .............................................. B60H 1/02
[52] U.S. Cl. ............................ 237/12.3 C; 126/110 B; 285/337
[58] Field of Search ..................... 237/12.3 A, 12.3 C, 237/12.3 B; 98/2, 2.05; 285/335, 345, 337, 351, 223; 126/110 B, 116 R, 110 R, 110 C

[56] References Cited

U.S. PATENT DOCUMENTS 3,989,029  11/1976  Friedl et al. ..................... 126/110 B

OTHER PUBLICATIONS

E. A. Laboratories, "Instructions For Installation of Gasoline Heater For Cars", 1939.

Webasto, Spare Part List Model HL 2011, Mar. 1978.

Primary Examiner—Albert J. Makay
Assistant Examiner—Henry Bennett
Attorney, Agent, or Firm—Antonelli, Terry & Wands

[57] ABSTRACT

Vehicle heating unit comprising an air intake connection and an exhaust connection, which connections are communicable with corresponding inlet and outlet ducts through the vehicle bottom. In order to perform, in such a vehicle heater, the disassembly of the heating unit, even after several years of operation and consequently corroded coupling clamps for the exhaust manifold and the air connection pipe, a coupling unit attachable to the vehicle bottom is provided. The coupling unit comprises plug couplings or contact pressure couplings, equipped with gaskets for receiving the connections, and, associated therewith, coupling pipe sections oriented toward the outside. The exhaust manifold and the air intake manifold can be attached in the usual way to these coupling pipe sections. However, these manifolds need no longer be detached for the dismounting of the heating device. The coupling unit can be mounted within or externally of the vehicle.

29 Claims, 11 Drawing Figures

VEHICLE HEATER

BACKGROUND AND SUMMARY OF THE INVENTION

The invention relates to a vehicle heater with a heating unit comprising an air intake connection and an exhaust connection, which connections can be placed in communication with corresponding inlet and outlet ducts through the bottom of a vehicle.

Such vehicle heaters, which are also called auxiliary or parking heaters, are customarily mounted on the inside of the vehicle bottom and project, with their coupling pipes for exhaust and air intake, through bores in the vehicle bottom to the outside. The exhaust manifold and a fresh air supply conduit—possibly leading to a filter—are mounted to these coupling pipes, usually with the aid of a pipe clamp. The coupling clamps are exposed to dirt and splash water, since they are located at the bottom of the vehicle, so that they corrode to such an extent that they can no longer be disassembled, as a rule, in case the heater is to be dismounted for purposes of repairs or servicing.

Therefore, the present invention has a primary object of providing a vehicle heater, of the type discussed above, wherein the heating unit, even after several years of operation, can be rapidly and conveniently dismantled for servicing purposes.

A vehicle heater wherein the object has been attained, in accordance with a preferred embodiment, by the provision of a coupling unit which is mountable to the vehicle bottom and comprises plug couplings or contact pressure couplings that are equipped with gaskets for receiving the connections, and have, associated therewith, coupling pipe sections oriented toward the outside.

As a result of providing a coupling unit, the coupling pipe sections of which point to the outside and are there connected, with the aid of clamps or the like, to the exhaust manifold and/or to the air intake manifold, corrosion of the coupling clamps is not troublesome because the installed coupling unit remains likely mounted to the vehicle bottom, even in case the heating unit is removed, only the heating unit being taken out of the plug or contact pressure couplings. Since the heating unit is removed from the plug or contact pressure couplings merely by pulling its coupling pipes out, dismantling and assembly are extremely convenient and time-saving.

The fuel feed line for the vehicle heater may be extended through a bore through the vehicle bottom outside of the coupling unit and may be attached by means of a clamp in the interior of the vehicle at the fuel connection of the heating unit. According to an especially advantageous embodiment of the invention, however, the provision is made that the coupling unit, in its wall on the vehicle side and in its outside wall, has, respectively, one perforation for the fuel supply; that a fuel line can be attached to the fuel connection by means of a clamp located within the coupling unit; and that the fuel line has an excessive length sufficient for lifting the heating unit. This construction ensures that the coupling clamp for the fuel line is seated in a protected fashion in the interior of the coupling unit and consequently is not exposed to danger of corrosion. On account of the fact that the fuel line has a certain excessive length, the heating unit can be lifted out of its seat and then the fuel connecting clamp on the inside of the vehicle can be detached. Depending on the space available and on the type of vehicle, the vehicle heater can be mounted to the inside or to the outside of the vehicle bottom. With a view toward saving material, it is advantageous in both cases to have the coupling unit open on the side facing the vehicle bottom. In this case, the vehicle bottom represents the outside or inside wall of the coupling unit.

According to another advantageous embodiment of the invention, the heating unit can be pressed, with the aid of a clamping strap, against the coupling unit, whereby the connections are securely disposed in the plug or contact pressure coupling of the coupling unit.

Advantageously, the respective plug coupling consists of a ring gasket pressed in place between two parallel plates, each of which has a concentric, circular opening; the inside diameter of this ring gasket is somewhat smaller than the inside diameter of the openings; the plate located toward the outside of the vehicle carries the coupling pipe section, respectively leading to the vehicle, concentrically to its circular opening.

An especially satisfactory mounting of the coupling pipes can be obtained if, according to another advantageous embodiment, the respective plug coupling is constituted by a guiding pipe exhibiting on its inner wall at least one groove or crimp wherein an O-ring is arranged. An embodiment which is especially simple in structural respects and thus is preferred resides in that the respective plug coupling consists of a ring gasket having a continuous groove on the outside, the two lateral faces of this groove encompassing the rim of a hole in a carrier plate.

In order to be able to conveniently remove the heating unit from its mounting even while the fuel line is attached, the provision is made that the perforation in the wall of the coupling unit on the vehicle side has an inside diameter larger than the maximum radial dimension of the coupling clamp. To safely avoid penetration of fuel vapors into the interior of the vehicle in such a case, the provision is made that a disk with a gasket is mounted at the fuel supply connection of the heating unit, this disk covering the perforation in the wall on the vehicle side. This disk, together with the heating unit, is firmly pressed against the perforation and consequently establishes a perfect seal for the interior of the vehicle against gasoline or oil vapors.

Sealing of the vehicle interior against gasoline vapors or oil vapors can also be safely obtained by providing the fuel connection pipe with a sealing plug seated, with the interposition of a gasket, tightly within the perforation of the wall of the coupling unit on the vehicle side. Also in this case, the perforation can be made adequately large to be able to pull the coupling clamp into the interior of the vehicle when the heating unit is removed. Yet, the sealing plug ensures a tight seat of the fuel connection pipe on the wall of the coupling unit on the inside of the vehicle and thus seals the vehicle interior against fuel vapors.

To avoid penetration of splash water into the inner space of the coupling unit, another advantageous embodiment provides that the fuel line can be sealed with respect to the rim of the perforation in the outside wall of the coupling unit by means of an edge protector. It is suitable in this case to make the contact pressure of the edge protector lower than the contact pressure of the gasket in the perforation on the vehicle side, since in case of an escape of gasoline or oil vapors, the sealing effect of the edge protector would overcome, due to the excess pressure, earlier than the sealing effect of this gasket, and, accordingly, the exiting fuel vapor would be passing to the outside rather than into the interior of the vehicle.

It is advantageous from the viewpoint of safety to mount the coupling unit to the vehicle bottom with the interposition of a gasket which extends all around.

According to another advantageous embodiment, gasoline or oil vapors (should they be liberated in the interior of the coupling unit) and safely be exhausted to the outside by means of a ventilating opening permitting the entrance of air into the interior of the coupling unit, but preventing the entrance of splash water.

The installation and dismantling of the heating unit can, furthermore, be simplified by equipping the coupling unit with a quick-action coupling for the detachable, tight connection of a fuel line with a fuel connection pipe of the heating unit. The provision of several perforations in the vehicle bottom is avoided, if, in a further embodiment of the invention, the coupling pipe sections and optionally a fuel connection pipe are extended through a single cutout in the vehicle bottom, sealed by means of a gasket extending all around.

The coupling pipe sections can be fashioned in an especially advantageous manner as angled pipes that are rotatable with respect to the coupling unit about the axes of the exhaust connection and/or the air intake connection. Thus, the direction of the exhaust flow and the direction of the combustion air intake can be adjusted as desired in a simple way. There is no need for additional exhaust and combustion air intake elbows. The structural height can be kept small. In this arrangement, the structure becomes especially simple if the angled pipes have an annular flange projecting toward the outside and are rotatably supported above a contact surface of the coupling unit. A perfectly sealing plug connection can, in such a case, be attained with comparatively little expenditure by providing that the contact surface is the bottom of a gasket housing for accommodating the gasket of the plug coupling and is fashioned as an elastic sealing ring; and that the sealing ring arranged above the annular flange sealingly contacts, with its underside, the annular flange and, on the inside, the exhaust connection and the air intake connection, respectively.

In a further embodiment of the invention, the coupling unit can exhibit a dish-shaped cast base. The assembly of the coupling unit is thereby simplified. Suitably, a plate-shaped gasket having perforations for the air intake connection, the exhaust connection, and the fuel feed is disposed between the flange portion of the base and the vehicle bottom. Such a gasket reliably precludes the penetration of splash water into the interior of the vehicle. In case of a quick-action mounting base in the form of a cast component, the angled pipes underneath the vehicle bottom are advantageously connected rotatably with the free ends of cast collars of the base, which collars accommodate, with a clearance, the free ends of the exhaust connection and of the air intake connection. Preferably, the mutually facing ends of the angled pipes and of the cast collars are equipped with complementary rotary guides, and the mutually facing ends of the angled pipes and cast collars are also provided with outwardly projecting annular flanges held together by a V-clamp encompassing the annular flanges. Since, in this arrangement, the coupling sites of the angled pipes and of the cast collars lie outside of the vehicle, they need to gastight seal.

To provide a seal with respect to the interior of the vehicle, respectively, one sealing ring is placed, preferably, on the exhaust connection and on the air intake connection, this sealing ring being sealingly disposed between the outer wall of the heating unit and a contact surface on the topside of the base, the base having advantageously an annular duct on its topside arranged concentrically to the cast collar accommodating the exhaust connection, a sealing ring being arranged in the annular duct which sealingly engages the outer wall of the heating unit. This results in a further improvement of the seal in the critical zone of the exhaust connection.

The fuel connection pipe suitably carries a sealing plug in the direction toward the heating unit, this plug being encompassed by a sealing ring. To be able to separate the fuel line easily from the fuel connection pipe of the heating unit, even after a rather long period of operation, a further embodiment of the invention provides an advantageous design for the quick-action assembly base so that the latter, for the penetration of the fuel connection, has a cylindrical collar extending through a perforation of the vehicle bottom; and that a coupling pipe is detachably arranged at the fuel connection pipe, this coupling pipe, in turn, being attachable to the fuel line and carrying, between the mounting points with the fuel connection pipe and with the fuel line, a disk, which latter constitutes, together with the collar, a chamber vented toward the outside for receiving the connection between the fuel connection pipe and the coupling pipe.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
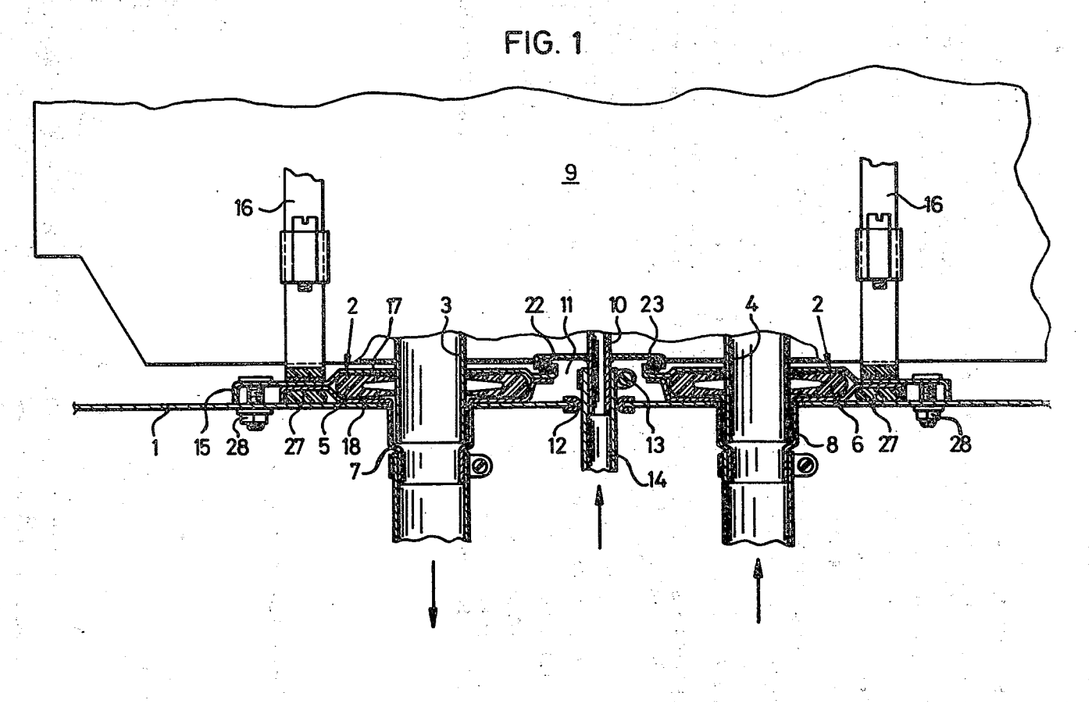
FIG. 1 is a section through a vehicle heater and coupling unit in accordance with the present invention, wherein an exhaust conduit and a combustion air conduit, as well as a fuel line, are conducted through the coupling unit, and wherein the coupling unit is mounted to the inside of the vehicle.

In FIG. 1, numeral 1 denotes the bottom of an automotive vehicle. In the interior of the vehicle (as shown in FIG. 1 above the vehicle bottom 1) a heating unit 9 is arranged with which the vehicle can be heated independently of the operation of the engine. Three coupling pipes lead out of the heating unit, namely a pipe connection 3 for exhaust gas, a pipe connection 10 for fuel, and a pipe connection 4 for combustion air. A coupling unit 2 is disposed above the vehicle bottom 1, i.e., in the interior of the vehicle.

This coupling unit comprises a housing panel 17 attached in its marginal zone or flange portion 15 to the vehicle bottom with the aid of screws 28 with the interposition of a continuously extending gasket 27. Perforations are provided in the housing panel 17 into which project the pipe connections 3 and 4 with sufficient clearance. Another perforation 11 is provided for the fuel supply line, the latter being sealed off by a disk 22 connected to the fuel connection pipe 10 with the interposition of a gasket 23. Annular gaskets 5 and 6, respectively, serve for a tight seat of the exhaust connection 3 and of the combustion air connection 4; these annular gaskets are pressed in place between the upper housing panel 17 and a lower panel 18 of the mounting unit. The perforation in the housing panel 17 is concentric to an opening in the carrier plate 18, passing over into a coupling pipe section 7. The opening in the upper housing panel 17, the opening in the carrier plate 18, and the pipe section adjoining the opening constitute a guide means for the coupling pipes 3 and 4, respectively. Between the metal parts, care is taken to provide a sufficient clearance of about 1 mm. Only the gasket 5 and the gasket 6, respectively, are firmly pressed against the pipes 3 and 4.

On the pipe sections 7 and 8, the exhaust manifold is attached with the aid of a clamp, in one case, and a conduit for fresh air is mounted, in the other case. A fuel line 14 is applied over the fuel socket 10 of the heating unit 9 and is attached by means of a pipe clamp 13 lying within the coupling unit. At the lower wall of the coupling unit, represented in the present embodiment by the vehicle bottom 1, the perforation 12 can be sealed off with respect to the fuel line with the aid of an edge protector. However, it is also possible to leave an open gap to permit exit of gasoline vapors or oil vapors. Two clamping straps 16 surrounding the heating unit and, on the other hand, being attached to the coupling unit, take care of a firm seating of the heating unit and of the coupling pipes.

If the heating unit 9 is to be dismantled for servicing purposes, only the two clamping straps have to be released, whereupon the heating unit can be lifted upwardly, as referred to the drawing. During this step, the exhaust connection 3 and the combustion air connection 4 are pulled out of their sockets and gaskets without having to loosen a screw for this purpose. Simultaneously with the lifting of the heating unit 9, the lid 22 attached to the fuel connecting pipe 10 is lifted, whereby the perforation 11 in the housing panel 17 is uncovered and the fuel line 14, having a certain excessive length, can be pulled out together with the clamp 13 through the perforation 11 in the upward direction. Thereafter, the fuel line can be stripped off after loosening of the clamp 13. Thus, the heating unit is uncoupled from its supply and discharge lines. The release of the clamp 13 at the fuel connecting pipe 10 presents no difficulties since this clamp lies in the protected space of the coupling unit 2 and thus is protected from corrosive splash water. There is no necessity for releasing the exhaust manifold and for detaching the combustion air feed conduit, which lie outside of the vehicle bottom and the mounting clamps of which are possibly corroded, in order to remove the device. Therefore, the mounting of the auxiliary heater and, above all, the dismantling after a relatively long operating period can be performed quickly and conveniently.

Figure 2:
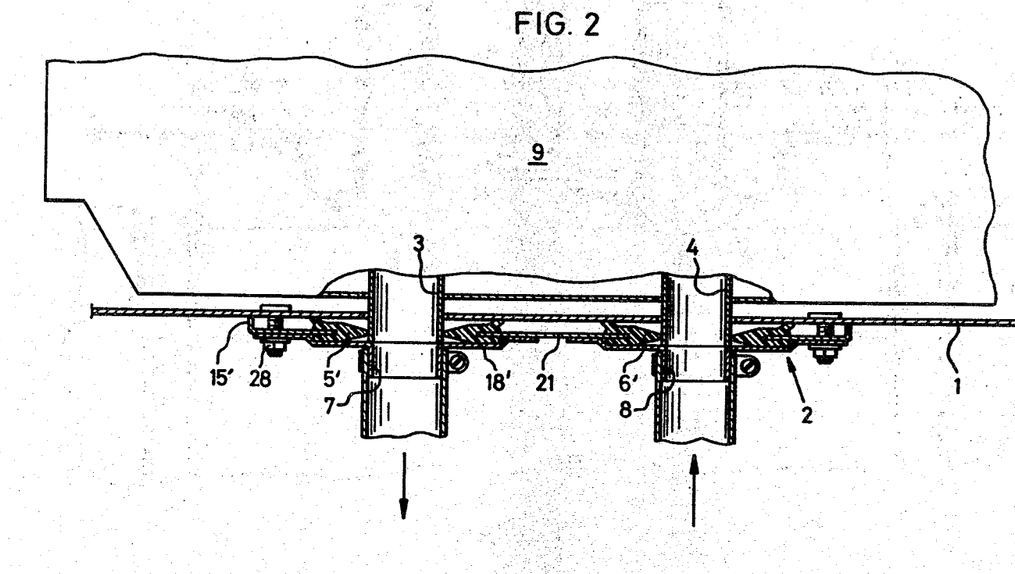
FIG. 2 shows a coupling unit according to the present invention, wherein the fuel line is extended through the bottom of the vehicle at a location spaced apart from the coupling unit, and the coupling unit is mounted to the outside of the vehicle.

FIG. 2 shows an arrangement wherein the coupling unit is disposed underneath the vehicle bottom 1, i.e., outside of the vehicle. The heating unit 9 again comprises an exhaust connection 3 and a combustion air connection 4. The fuel connection pipe (not shown) in this embodiment is not conducted through the coupling unit. The coupling unit consists essentially of a carrier plate 21 attached to the vehicle bottom 1 in its marginal or flanged zones 15' with the aid of screws 28. Openings for the exhaust connection 3 and the combustion air connection 4 are arranged in the carrier plate 21 with sufficient clearance, ring gaskets 5', 6' being disposed in these openings. The ring gaskets have a groove on the outside into which projects the rim of the carrier plate 21. Underneath the openings for the connections 3 and 4, disk-shaped panels 18' are welded in place and pass over into a coupling pipe section 7 and 8, respectively. The connection 3 and 4 is, respectively, tightly seated within the ring gasket 5', 6', there being an adequate tolerance clearance between the connections and the rim of the hole in the vehicle bottom, as well as between the connection and the wall of the pipe section 7 or 8. Only the gaskets 5', 6' are in firm contact with the connections 3 and 4, respectively. Also, in this embodiment, the heating unit is attached with the aid of a clamping strap (not shown).

No screws whatever need be released for removal of the heating unit to service same. Rather, it is sufficient to pull the heating unit, together with the connections 3 and 4, out of the gaskets 5', 6'. The exhaust manifold seated on the coupling pipe section 7 need not be detached, and the same holds true for the air duct seated on the coupling pipe section 8. This arrangement has the advantage that no space is required in the interior of the vehicle for the coupling unit, and, thus, the structural height of the heater is not enlarged by the coupling unit provided according to this invention.

Figure 3:
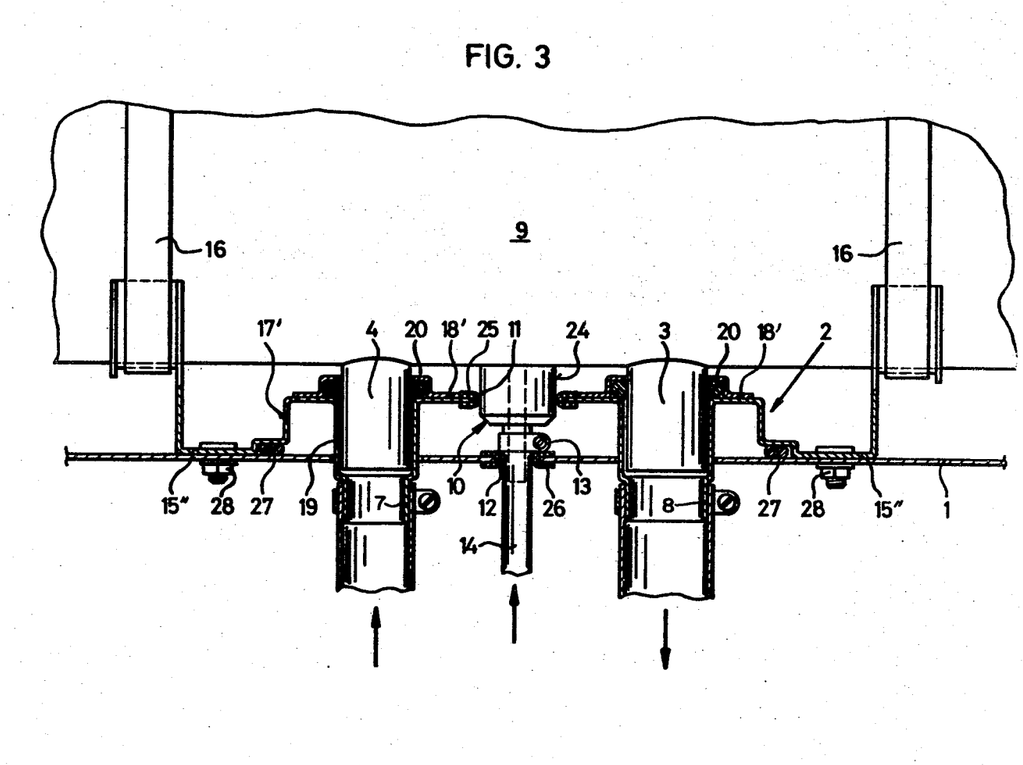
FIG. 3 illustrates another version of an embodiment with an internally arranged coupling unit.

FIG. 3 shows a parking heater wherein the coupling unit provided according to the invention is again mounted within the vehicle. The heating unit carries reference numeral 9 and is again attached with clamping straps 16. The heating unit comprises three downwardly oriented coupling pipes, namely, a connection 4 for combustion air, a connection 3 for exhaust gas, and a connection 10 for fuel. The coupling unit 2 comprises essentially an upper housing wall panel 17' exhibiting a flange 15" along the rim, by which flange the panel is attached to the vehicle bottom 1 with the aid of screws 28. The housing wall panel 17' exhibits three openings for the three connections. The openings for connections 4 and 3 pass over into downwardly oriented guide pipes 19 wherein the connections 3 and 4 are seated with adequate tolerance clearance. Disk-like plates 18' are welded in place above the openings for the connections 3 and 4, these plates forming a groove in which are seated, respectively, gaskets 20 of the shape of an O-ring. The guide pipes 19 pass over into the coupling pipe sections 7, 8 for the exhaust manifold and/or the fresh air supply. The fuel connection pipe 10 has a sealing plug 24 near the heating unit 9, this plug filling the perforation 11 in the upper housing panel 17', a gasket 25 being interposed therebetween. The perforation 11 in the housing panel 17' is sufficiently large so that the fuel connection pipe 10 with the clamp 13 can be fitted therethrough. The fuel line 14 is sealingly extended, with the aid of an edge protector 26, through a perforation 12 in the vehicle bottom 1 representing the lower boundary wall of the coupling unit 2.

In order to dismantle the heating unit 9, it is merely necessary to remove the clamping straps 16. Thereafter, the heating unit 9 can be pulled off in the upward direction. During this step, the connections 3 and 4 move out of the guide pipes 19. The fuel line 14 has adequate length for participating in this movement. Once the heating device has been lifted to a sufficiently great extent, the clamp 13 which, due to its protected location in the interior of the coupling unit, is not corroded, can be readily loosened. The heating unit is thus released. A detachment of the exhaust manifold or of the fresh air conduit is unnecessary.

By means of a gasket 27, the coupling unit 2 is tightly mounted on the vehicle bottom 1 so that the discharge of gasoline vapors or oil vapors into the interior of the vehicle is safely avoided. The gasket 25, likewise, contributes toward this end since the gasket surrounds the sealing plug 24 of the fuel connection 10. If gasoline vapor or oil vapor is discharged within the interior of the coupling unit 2, such vapor can be exhausted, via the edge protector 26 since it engages line 14 with a lower contact pressure than the gasket 25 engages plug 24.

Figure 4:
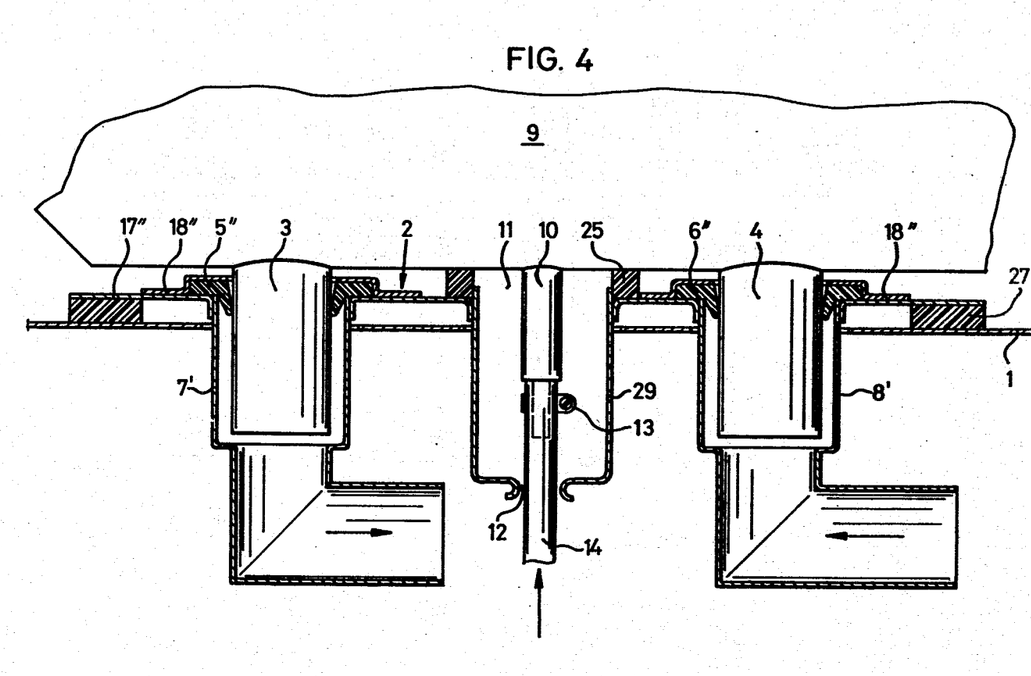
FIGS. 4 and 5 show further embodiments of the coupling unit with connections for exhaust gas, fresh air, and fuel.

Another embodiment with an internally disposed coupling unit is illustrated in FIG. 4. Once again, reference numeral 1 denotes the vehicle bottom, and numeral 9 the heating unit. The coupling connections for exhaust gas and fresh air are once more denoted by 3 and 4. The coupling unit 2 comprises an upper wall panel 17" to which are mounted tubular coupling elements 7' and 8', respectively, for example, by welding. Disk-shaped plates 18" are welded in place above the openings of the carrier panel 17''', these openings being concentric to the pipe sections 7 and 8, respectively. The plates 18" form, together with the panel 17", a space for gaskets 5", 6". The connections 3 and 4 of the heating unit are pushed into this space. In order to attain a low structural height of the heater, in spite of the internally located construction of this coupling unit, the protective space for the fuel line 14 projects downwardly into the area outside of the vehicle. The protective space for the fuel line comprises a box 29 having a respective one of perforation openings 11 and 12 at each end. This box 29 is welded into an opening of the housing wall panel 17" of the mounting unit. The upper opening 11, i.e., the opening facing the automotive vehicle, is provided with a gasket 25 wherein the fuel connection pipe 10 is tightly seated. The lower opening 12 has rounded ends and leaves a small air gap with respect to the fuel line, so that gasoline vapors or oil vapors can be passed therethrough.

Figure 5:
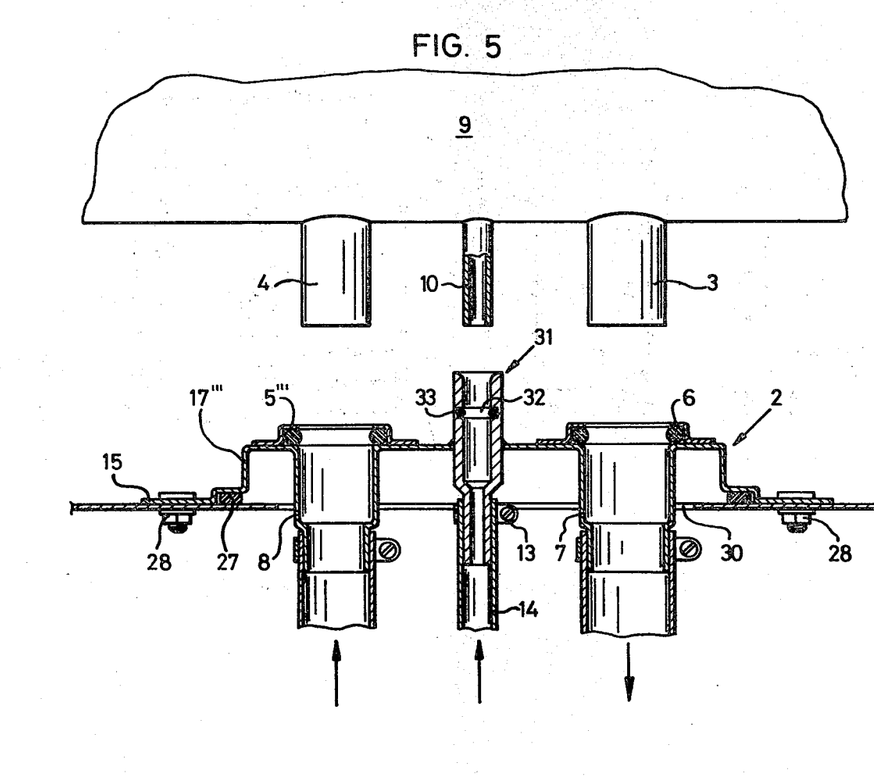

In the embodiment of FIG. 5, the vehicle bottom 1 is equipped with a single perforation 30 of a sufficiently large dimension for allowing the penetration of the coupling pipe sections 7, 8 mounted to the interiorly located carrier panel 17''', as well as a quick-action coupling 31 joined to the carrier panel. The carrier panel 17'''is attached to the vehicle bottom 1 by way of screws 28. The continuously extending gasket 27 arranged in the zone of the flange part 15 of the carrier panel 17 serves for sealing the perforation 30. Above the coupling pipe sections 7, 8, the gaskets 5, 6 are arranged which, when the heating unit 9 is attached, come into engagement with the exhaust connection 3 and the air intake connection 4, respectively. The fuel line 14 is mounted, by way of the clamp 13, to the portion of the quick-action coupling 31 projecting downwardly from the carrier panel 17. An O-ring 33 is seated in an annular groove 32 of the quick-action coupling 31, this O-ring sealingly contacting the fuel connection pipe 10. In this embodiment, the heating unit 9 can be pulled off without releasing the clamp 13.

Figure 6:
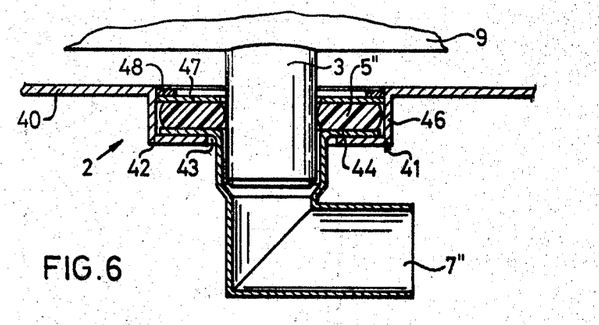
FIGS. 6-8 show modified embodiments with a rotatable angled pipe.

FIG. 6 illustrates a modified embodiment wherein the coupling unit 2 exhibits a housing or base panel 40 with a downwardly projecting sealing housing 41 having a bottom 42 and a vertical side wall 46. The bottom 42 of the sealing housing is equipped with a perforation 43 through which extends a coupling pipe section 7" in the form of an angled pipe. The angled pipe has at its upper end an outwardly projecting annular flange 44 that is rotatably supported on the bottom 42. The plug coupling 5'$^v$, in the form of an elastic sealing ring, is pushed onto the exhaust connection 3. The sealing ring 5'$^v$ rests with its underside on the topside of the annular flange 44 and presses inwardly against the exhaust connection 3. A washer 47 and a clamping ring 48 are arranged above the sealing ring; the clamping ring prevents the sealing ring 5'$^v$ from being pulled out of the sealing housing 41 during the removal of the heating unit 9. By means of stops (not shown) at the gasket housing 41 and/or at the annular flange 44, the angle of rotation of the coupling pipe section 7" can be limited as desired, for example, to avoid excessive heating of parts located in the vicinity. The coupling pipe section 7", designed as an angled pipe, can, in this embodiment, constitute the exhaust manifold proper, so that, just as in the case of the arrangement of FIG. 4, a corresponding clamp and its mounting can be eliminated. The plug coupling with coupling pipe section, associated with the air intake connection 4, can be designed in the same way.

Figure 7:
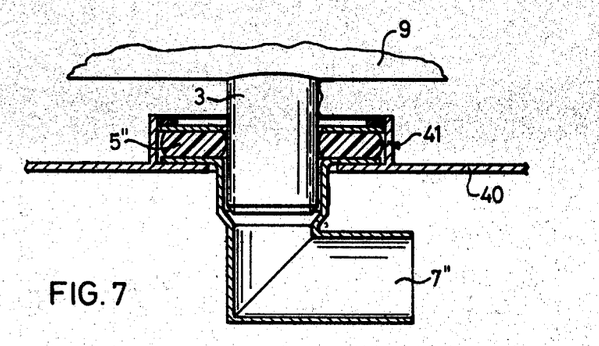

The embodiment of FIG. 7 differs from the arrangement of FIG. 6 merely by the feature that the sealing housing 41 is located above the housing panel 40.

Figure 8:
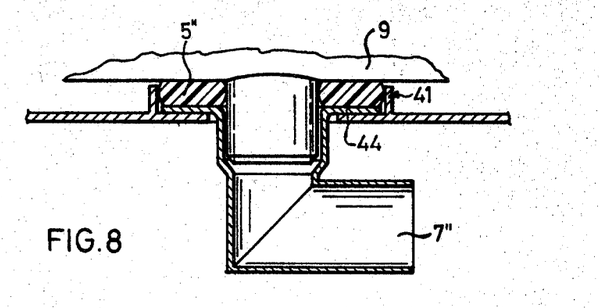

In the modified embodiment of FIG. 8, the sealing ring 5'$^v$ is clamped in between the topside of the annular flange 44 and the outer wall of the heating unit 9 so that the washer 47 and the clamping ring 48 can be omitted.

Figure 9:
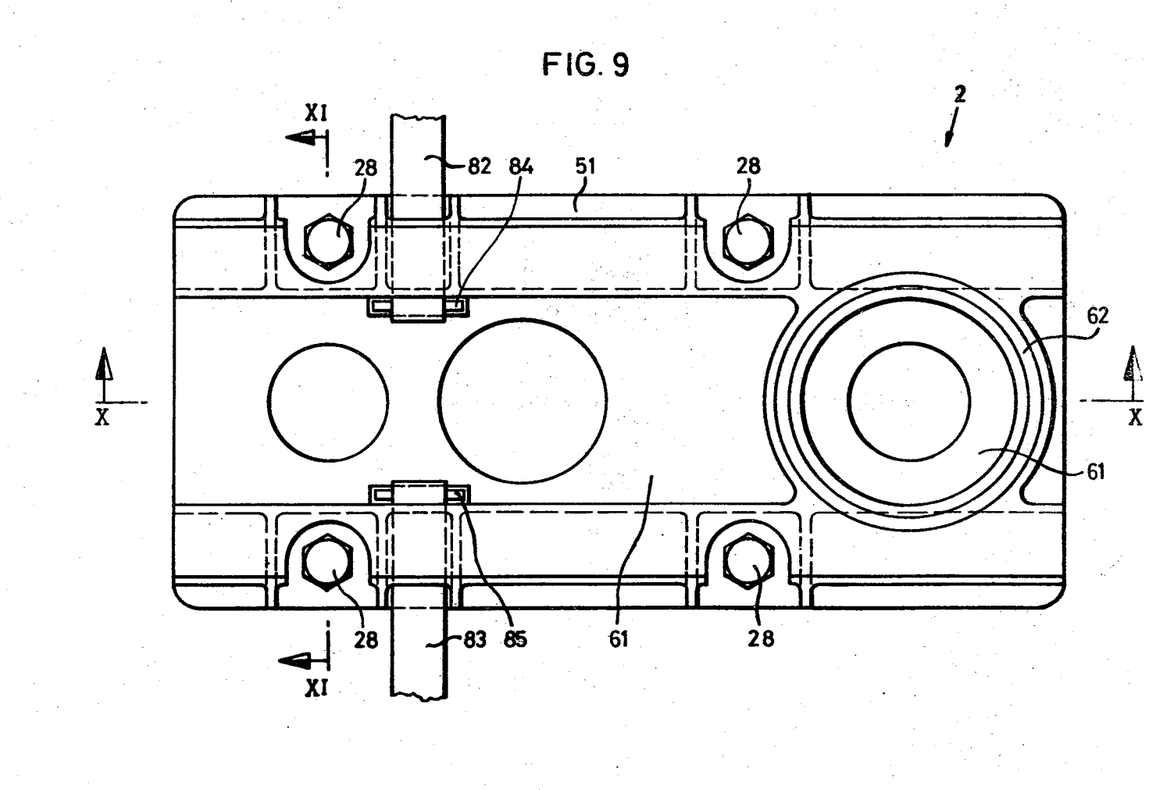
FIG. 9 is a top view of a cast quick-action mounting base.
Figure 10:
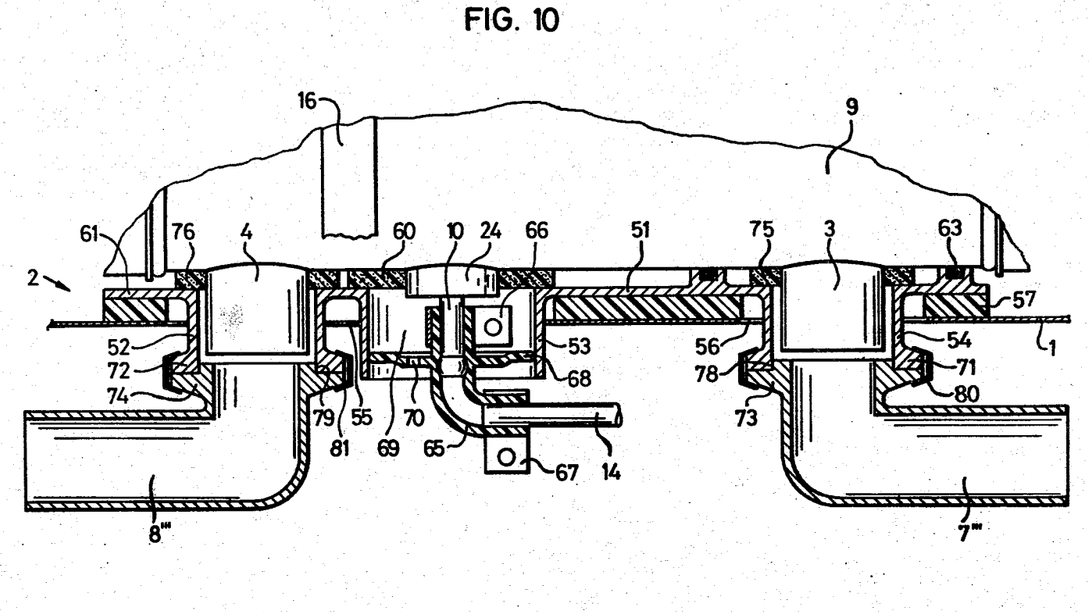
FIG. 10 is a section along line X—X of FIG. 9.
Figure 11:
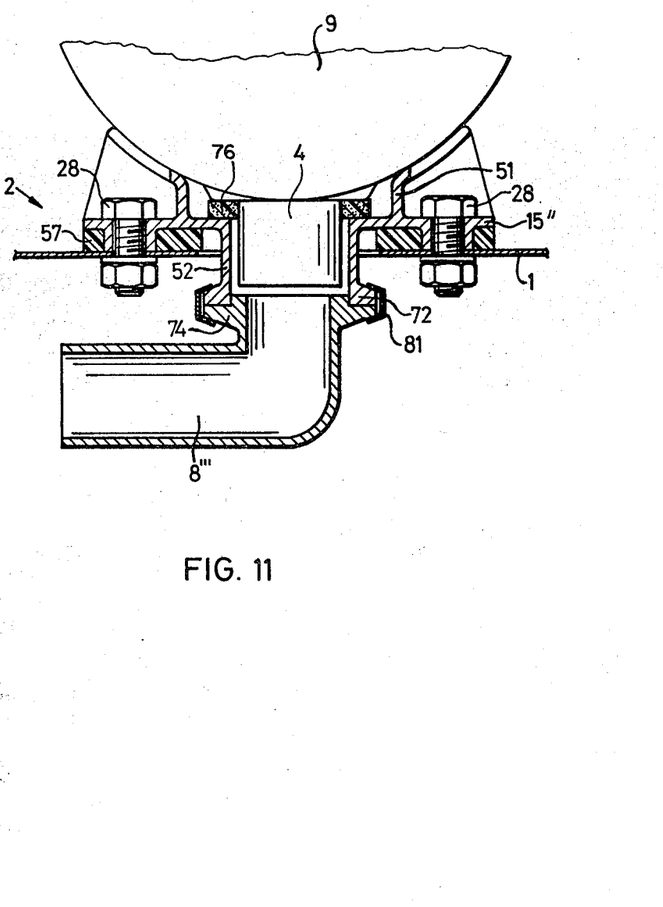
FIG. 11 is a section along line XI—XI of FIG. 9.

FIGS. 9 through 11 show a further modified embodiment of the invention wherein the coupling unit 2 consists essentially of a dish-shaped, cast base 51. The base 51 is, preferably, a pressure-cast part of a light metal, for example, aluminum, with integrally cast collars 52, 53 and 54. The collars 52, 53, 54 extend through perforations 55, 56 in the vehicle bottom; in the present case, the common perforation 55 is provided for the collars 52 and 53. The base 51 exhibits a flange member 15" for mounting to the vehicle bottom 1. A plate-shaped gasket 57 with perforations for the collars 52, 53, 54 is laid between the flange member 15" and the vehicle bottom 1. Respectively, one of sealing rings 75, 76, and 60, respectively, is placed on the exhaust connection 3, the air intake connection 4, and a sealing plug 24 surrounding the fuel connection pipe 10 of the heating unit 9. These sealing rings are held at the topside of the base 51 between the outer wall of the heating unit 9 and a contact surface 61. Since, for safety reasons, a perfect seal in the region of the exhaust connection 3 is of special importance, an annular duct 62 (FIG. 9) extending concentrically with respect to the collar 54 is provided on the topside of the base 51. A sealing ring 63, preferably in the form of an O-ring, is accommodated in the annular duct 62, this sealing ring, likewise, being in sealing contact with the outer wall of the heating unit 9.

A coupling pipe 65 is fixed in place by way of a clamp 66 at the end of the fuel connection 10 projecting downwardly past the sealing plug 24. The other end of the coupling pipe 65 is releasably connected to the fuel line 14 via a clamp 67. The coupling pipe 65, which can be selectively a flexible or rigid component, carries in its central zone a disk 68, the outer rim of which contacts the inner wall of the collar 53. The gasket 60, the collar 53, and the disk 68 define a chamber 69 accommodating the connection between the fuel connecting pipe 10 and the coupling pipe 65. The chamber 69 is vented toward the outside via an opening 70.

The collars 52 and 54 exhibit annular flanges 71, 72, which project outwardly. Complementarily shaped annular flanges 73, 74 are formed at one end of the angled-pipe-shaped coupling elements 7''', 8'''. The annular flanges 73, 74 have shoulders 78, 79 extending into the collars 52, 54 and acting as rotary guides for rotation of the angled pipes 7''', 8'''. The annular flanges 71, 73 and 72, 74 are each encompassed by a V-clamp 80 and 81 in order to rotatably connect, in this way, the angled pipes 7''', 8''' with the collars 52, 54.

The heating unit 9 is retained on the quick-action mounting base 51 by means of a clamping strap 16. The clamping strap 16 consists, in this case, of two parts 82, 83, one end of which is folded over and fixed in each case by means of a pin 84 and 85 to the base 51, as indicated in FIG. 9. In order to attach the base 51 to the vehicle bottom 1, the screws 28 are provided. A clearance is provided between the outer circumference of the connections 3, 4 and the inner walls of the collars 52, 54, so that unavoidable tolerances with respect to the axial spacings of the connections 3, 4 and of the collars 52, 54 pose no problems.

After releasing the clamping strap 16, the heating unit 9 can simply be pulled off the base 51, in a similar way as in the case of the previously discussed embodiments, the fuel line 14 again having an adequate length for participating in this movement.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. Vehicle heater with a heating unit comprising an air intake connection and an exhaust connection, said connections being respectively communicable, through a bottom wall of a vehicle, with corresponding inlet and outlet ducts located on an opposite side of said bottom wall therefrom, wherein a coupling unit, that is attachable to the vehicle bottom wall, is provided for detachably interconnecting said inlet and outlet connections of the heating unit indirectly with said inlet and outlet ducts, said coupling unit comprising contact pressure couplings, equipped with gaskets for receiving said inlet and outlet connections of the heating unit, and, associated therewith, coupling pipe sections which are outwardly directed for connection with said inlet and outlet ducts, whereby the heating unit on one side of the bottom wall is detachable from said coupling unit independent of the connection between the coupling unit and said ducts on the opposite side of said bottom wall.

2. Vehicle heater with a heating unit comprising an air intake connection and an exhaust connection, said connections being respectively communicable, through a bottom wall of a vehicle, with corresponding inlet and outlet ducts located on an opposite side of said bottom wall therefrom, wherein a coupling unit, that is attachable to the vehicle bottom wall, is provided for detachably interconnecting said inlet and outlet connections of the heating unit indirectly with said inlet and outlet ducts, said coupling unit comprising contact pressure couplings, equipped with gaskets for receiving said inlet and outlet connections of the heating unit, and, associated therewith, coupling pipe sections which are outwardly directed for connection with said inlet and outlet ducts, whereby the heating unit on one side of the bottom wall is detachable from said coupling unit independent of the connection between the coupling unit and said ducts on the opposite side of said bottom wall; wherein the coupling unit has a dish-shaped cast base; and further comprising a fuel connecting pipe and a fuel line attachable to the fuel connection pipe by means of a clamp which is located, in use, within the coupling unit, said fuel line having a length sufficient for enabling lifting the heating unit relative to the coupling unit without releasing the clamp attachment thereof to the fuel pipe, wherein the coupling unit, in use, has, in a wall which is located toward the inside of the vehicle and in a wall which is located toward the outside of the vehicle, respectively, one perforation for enabling attachment of the fuel connecting pipe to the fuel line supply.

3. Vehicle heater according to claim 2, wherein the coupling unit has a flange member for attachment to the inside of the vehicle bottom wall, the vehicle bottom wall constituting the outside wall of the coupling unit.

4. Vehicle heater according to claim 2, wherein the coupling unit has a flange member for attachment to the outside of the vehicle bottom wall, the vehicle bottom wall constituting the inside wall of the coupling unit.

5. Vehicle heater according to one of claims 1 to 4, wherein at least one clamping strap is provided for pressing the air intake connection and the exhaust connection against the contact pressure couplings, said strap surrounding the heating unit.

6. Vehicle heater according to one of claims 1 to 4, wherein each of the contact pressure couplings is formed of a ring gasket pressed in place between two parallel plates which have a circular opening, the inside diameter of the ring gasket being somewhat smaller than the diameter of the openings; and wherein the one of the plates of the coupling located toward the outside of the vehicle carries the respective coupling pipe section, which leads from the inside to the outside of the plate concentrically to its circular opening.

7. Vehicle heater according to one of claims 1 to 4, wherein each of the respective plug couplings is formed of a guide pipe and at least one internal groove in which an O-ring is disposed.

8. Vehicle heater according to one of claims 1 to 4, wherein each of the contact pressure couplings has a ring gasket with an external continuously extending groove, the rim of a hole in a carrier plate of the coupling being encompassed by lateral flanks of said groove.

9. Vehicle heater according to claim 2, wherein the perforation in the wall of the coupling unit located toward the inside of the vehicle has a diameter that is larger than the maximum radial dimension of said clamp; and wherein a disk with a gasket is attached to the fuel connecting pipe of the heating unit for covering the perforation of the coupling unit inside wall.

10. Vehicle heater according to claim 2, wherein the perforation in the wall of the coupling unit located toward the inside of the vehicle has a diameter that is larger than the largest radial bore of said clamp; and wherein the fuel connecting pipe, on a portion located near the heating unit, has a sealing plug for seating, in an in-use position, tightly in the perforation of the coupling unit inside wall with a gasket interposed therebetween.

11. Vehicle heater according to claim 2, wherein an edge protector is provided for sealing the fuel line with respect to the rim of the perforation in the outside wall of the coupling unit by contact pressure.

12. Vehicle heater according to claim 11, wherein the perforation in the wall of the coupling unit located toward the inside of the vehicle has a diameter that is larger than the largest radial bore of said clamp; and wherein the fuel connecting pipe, on a portion located near the heating unit, has a sealing plug for seating, in an in-use position, tightly in the perforation of the coupling unit inside wall with a gasket interposed therebetween, the fuel line and plug being sized so as to cause the contact pressure produced by the edge protector to be lower than contact pressure produced between the gasket in the perforation of the coupling unit inside wall, whereby any escaping fuel vapors will be vented exteriorly of the vehicle.

13. Vehicle heater according to claim 1 or 2 or 3, wherein the coupling unit is provided with a continuously extending gasket for sealing the coupling unit against the vehicle bottom wall.

14. Vehicle heater according to one of claims 1 to 4, wherein the coupling unit has a ventilating opening.

15. Vehicle heater according to claim 1, wherein the coupling unit is provided with a quick-action coupling for the detachable, tight coupling of a fuel line to a fuel connecting pipe of the heating unit.

16. Vehicle heater according to claim 1, wherein the vehicle bottom wall constitutes an outside wall of the coupling unit, the coupling pipe sections being extended through a single perforation of said vehicle bottom wall; and wherein the coupling unit is provided with a continuously extending gasket for sealing engagement about said single perforation.

17. Vehicle heater according to one of claims 1 to 4, wherein the coupling pipe sections are angled pipes mounted so as to be rotatable with respect to the coupling unit, as a whole, about a respective axis of the exhaust connection and the air intake connection.

18. Vehicle heater according to claim 17, wherein the angled pipes each have an outwardly projecting annular flange that is rotatably supported above a contact surface of the coupling unit.

19. Vehicle heater with a heating unit comprising an air intake connection and an exhaust connection, said connections being respectively communicable, through a bottom wall of a vehicle, with corresponding inlet and outlet ducts located on an opposite side of said bottom wall therefrom, wherein a coupling unit, that is attachable to the vehicle bottom wall, is provided for detachably interconnecting said inlet and outlet connections of the heating unit indirectly with said inlet and outlet ducts, said coupling unit comprising contact pressure couplings, equipped with gaskets for receiving said inlet and outlet connections of the heating unit, and, associated therewith, coupling pipe sections which are outwardly directed for connection with said inlet and outlet ducts, whereby the heating unit on one side of the bottom wall is detachable from said coupling unit independent of the connection between the coupling unit and said ducts on the opposite side of said bottom wall; wherein the coupling unit has a dish-shaped cast base; wherein the angled pipes each have an outwardly projecting annular flange that is rotatably supported above a contact surface of the coupling unit; wherein said contact surface is constituted by the bottom of a sealing housing of the respective coupling, the housing accommodating a gasket which is fashioned as an elastic sealing ring; and wherein the sealing ring is seated above an annular flange of the housing and sealingly contacts, with its underside, said annular flange and, with an interior surface, is in sealing contact with a respective one of the exhaust connection and the air intake connection.

20. Vehicle heater according to claim 1, wherein the coupling unit has a dish-shaped cast base.

21. Vehicle heater with a heating unit comprising an air intake connection and an exhaust connection, said connections being respectively communicable, through a bottom wall of a vehicle, with corresponding inlet and outlet ducts located on an opposite side of said bottom wall therefrom, wherein a coupling unit, that is attachable to the vehicle bottom wall, is provided for detachably interconnecting said inlet and outlet connections of the heating unit indirectly with said inlet and outlet ducts, said coupling unit comprising contact pressure couplings, equipped with gaskets for receiving said inlet and outlet connections of the heating unit, and, associated therewith, coupling pipe sections which are outwardly directed for connection with said inlet and outlet ducts, whereby the heating unit on one side of the bottom wall is detachable from said coupling unit independent of the connection between the coupling unit and said ducts on the opposite side of said bottom wall; wherein the coupling unit has a dish-shaped cast base; wherein the base has a flange member and a plate-shaped gasket; and wherein the gasket has perforations for the air intake connection, the exhaust connection, and a fuel supply connection, and is arranged for providing a seal between the flange member of the base and the vehicle bottom wall.

22. Vehicle heater with a heating unit comprising an air intake connection and an exhaust connection, said connections being respectively communicable, through a bottom wall of a vehicle, with corresponding inlet and outlet ducts located on an opposite side of said bottom wall therefrom, wherein a coupling unit, that is attachable to the vehicle bottom wall, is provided for detachably interconnecting said inlet and outlet connections of the heating unit indirectly with said inlet and outlet ducts, said coupling unit comprising contact pressure couplings, equipped with gaskets for receiving said inlet and outlet connections of the heating unit, and, associated therewith, coupling pipe sections which are outwardly directed for connection with said inlet and outlet ducts, whereby the heating unit on one side of the bottom wall is detachable from said coupling unit independent of the connection between the coupling unit and said ducts on the opposite side of said bottom wall; wherein the coupling unit has a dish-shaped cast duct; and wherein the coupling pipe sections are angled pipes mounted so as to be rotatable with respect to the coupling unit, as a whole, about a respective axis of the exhaust connection and the air intake connection, wherein the angled pipes are rotatably connected with free ends of cast collars of the base, said collars accommodating, with a clearance, the exhaust connection and the air intake connection.

23. Vehicle heater according to claim 22, wherein mutually facing ends of the angled pipes and the cast collars are provided with complementary rotary guide means.

24. Vehicle heater according to claim 22 or 23, wherein mutually facing ends of the angled pipes and of the cast collars have outwardly projecting annular flanges, said flanges being held together by means of a V-clamp surrounding the annular flanges.

25. Vehicle heater with a heating unit comprising an air intake connection and an exhaust connection, said connections being respectively communicable, through a bottom wall of a vehicle, with corresponding inlet and outlet ducts located on an opposite side of said bottom wall therefrom, wherein a coupling unit, that is attachable to the vehicle bottom wall, is provided for detachably interconnecting said inlet and outlet connections of the heating unit indirectly with said inlet and outlet ducts, said coupling unit comprising contact pressure couplings, equipped with gaskets for receiving said inlet and outlet connections of the heating unit, and, associated therewith, coupling pipe sections which are outwardly directed for connection with said inlet and outlet ducts, whereby the heating unit on one side of the bottom wall is detachable from said coupling unit independent of the connection between the coupling unit and said ducts on the opposite side of said bottom wall; wherein the coupling unit has a dish-shaped cast duct; and wherein, respectively, one sealing ring is placed on the exhaust connection and the air intake connection, which sealing ring sealingly rests between an outer wall of the heating unit and a contact surface on the topside of the base.

26. Vehicle heater according to claim 25, wherein the base has, on its topside, an annular duct which is arranged concentrically to the cast collar accommodating the exhaust connection; and wherein a sealing ring is housed in the annular duct, this ring, in use, sealingly contacting the outer wall of the heating unit.

27. Vehicle heater with a heating unit comprising an air intake connection and an exhaust connection, said connections being respectively communicable, through a bottom wall of a vehicle, with corresponding inlet and outlet ducts located on an opposite side of said bottom wall therefrom, wherein a coupling unit, that is attachable to the vehicle bottom wall, is provided for detachably interconnecting said inlet and outlet connections of the heating unit indirectly with said inlet and outlet ducts, said coupling unit comprising contact pressure couplings, equipped with gaskets for receiving said inlet and outlet connections of the heating unit, and, associated therewith, coupling pipe sections which are outwardly directed for connection with said inlet and outlet ducts, whereby the heating unit on one side of the bottom wall is detachable from said coupling unit independent of the connection between the coupling unit and said ducts on the opposite side of said bottom wall; wherein the coupling unit has a dish-shaped cast duct; and wherein the heating unit has a fuel connecting pipe with a sealing plug that is encompassed by a sealing ring which is sealingly placed between an outer wall of the heating unit and a contact surface on the topside of the base.

28. Vehicle heater according to claim 27, wherein the cast base has a cylindrical collar for passage of the fuel connecting pipe therethrough, this collar, in use, passing through a perforation in the vehicle bottom wall; and wherein a coupling connection is detachably arranged at the fuel connecting pipe, said coupling connection, in turn, being attachable to a fuel line and carrying, between mounting points with the fuel connecting pipe and the fuel line, a disk constituting, together with the cylindrical collar, a chamber that is vented toward the outside.

29. Vehicle heater according to one of claims 19, 21, 22, 25, or 27, wherein at least one clamping strap is provided for pressing the air intake connection and the exhaust connection against the contact pressure couplings, said strap surrounding the heating unit.

* * * * *